Sept. 15, 1959     K. TRUMPER     2,904,077
SHOCK ABSORBERS

Filed June 25, 1956     2 Sheets-Sheet 1

INVENTOR.
Konrad Trümper
BY Michael S. Striker

Sept. 15, 1959 K. TRUMPER 2,904,077
SHOCK ABSORBERS

Filed June 25, 1956 2 Sheets-Sheet 2

INVENTOR.
Konrad Trümper
BY Michael S. Striker
agt.

2,904,077
Patented Sept. 15, 1959

2,904,077

SHOCK ABSORBERS

Konrad Trumper, Weidenau (Sieg), Germany, assignor to Rheinstahl Siegener Eisenbahnbedarf Aktiengesellschaft, Dreis-Teiefenbach, Krs. Siegen, Germany Application June 25, 1956, Serial No. 593,483

Claims priority, application Germany November 28, 1955

7 Claims. (Cl. 138—30)

The present invention relates to shock absorbers.

In certain types of shock absorbers the shock is absorbed by a fluid whose pressure is increased during absorption of the shock. Such a fluid may surround, at least partly, an elastic container having a fluid such as a gas therein which opposes the increase in pressure of the shock absorbing fluid during a decrease in the volume of the elastic container. When the fluid surrounding such an elastic container has an extremely large increase in pressure the elastic container contracts to a very great degree, and such large contraction of the elastic container results in the formation of cracks and the like therein which greatly limit the life of such an elastic container. Also, where the fluid medium surrounding an elastic container of this type is continually changing its pressure, although not to very great extents, the rapid and frequent contraction and expansion of the elastic container also results in a failure thereof within a relatively short time.

Shock absorbers of this type may be used with vehicles, for example.

One of the objects of the present invention is to provide a shock absorber wherein an elastic container of the above type is assured a long, operable life even though there may be great increases in the pressure of the fluid at the exterior of the elastic container and even though the elastic container is subject to frequent contractions and expansions.

Another object of the present invention is to provide a shock absorber wherein an elastic container of the above type may be made of conventional, easily obtainable materials and still have a long life.

A further object of the present invention is to provide a shock absorber of the above type wherein the elastic container has a limited degree of contraction.

An additional object of the present invention is to provide a shock absorber capable of accomplishing the above objects and at the same time composed of simple and ruggedly constructed elements which are very reliable in operation and which can be conveniently and easily assembled.

With the above objects in view the present invention mainly consists of a shock absorber which includes an outer container and an inner container made of an elastic material located within the outer container so that the inner container may expand and contract in response to pressure changes of a fluid in the outer container located at the exterior of the inner container. A means is located within the inner container for limiting the extent of contraction thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings in which:

Figure 1:
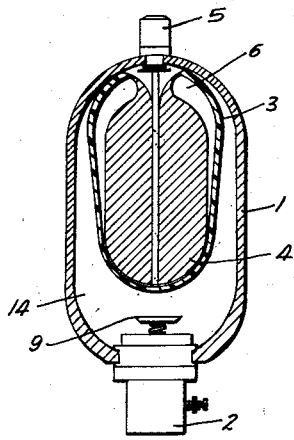
Fig. 1 is a sectional elevational view of one embodiment of a shock absorber according to the present invention.

Referring now to the drawings, and to Fig. 1 in particular, it will be seen that the shock absorber of Fig. 1 includes an outer rigid container 1 made of steel, for example. The bottom end of the container 1, as viewed in Fig. 1, is connected in a fluid-tight manner to one end of a conduit means 2 which communicates, for example, with a cylinder in which a fluid is located under pressure. A piston may slide in this cylinder and be connected in any suitable way to the device whose shocks are to be absorbed, so that when the piston moves in the cylinder so as to decrease the interior volume thereof, the fluid under pressure, such as oil, for example, will flow along the conduit means 2 into the interior of the outer container 1, and then of course, when the force of the shock diminishes the fluid will flow back to the cylinder.

An elastic container 3 made of stretchable rubber or the like, for example, or of a suitable plastic resistant to oil when the fluid under pressure is in the form of oil 14, for example, is located in the interior of the container 1 and is fixed at its upper portion to the upper wall of the container 1, as viewed in Fig. 1. Within the elastic inner container 3 is located a gas 6 which is under pressure.

It is apparent that when oil 14 flows into the container 1 during absorption of shocks the pressure of the gas 6 will increase and the container 3 will contract, and where the container 3 contracts to a very large degree the material thereof will soon develop cracks and fissures, and the same is true when the container 3 carries out frequent contractions and expansions. In order to prevent this undesirable result, a rigid body 4 is located within the elastic container 3, and this rigid body 4 forms a means for limiting the extent to which the container 3 may contract. The rigid body 4 is joined at its upper end to the interior of the container 3 and is formed with an axial bore communicating with the interior of the container 3. Although only one axial bore is shown in Fig. 1, it is apparent that the rigid body 4, which may be made of any solid substantially rigid material, may have additional bores located therein. A plug 5 closes the opening at the top of the container 1 in a fluid-tight manner and additionally serves to mount the container 3 together with the rigid body 4 therein in the outer container 1 in the position shown in Fig. 1, the plug 5 also serving to seal the interior of the container 3 from the interior of the container 1.

When the pressure of the oil 14 decreases, so that the volume of oil in the container 1 diminishes, the gas 6 which is under pressure will expand the container 3, and when the oil pressure drops to an extremely large degree, it is possible that a part of the container 3 would move in an undesirable manner into the conduit 2. In order to prevent this result, the end of the conduit 2 connected to the container 1 is provided with a valve 9 which is engaged by the container 3 during expansion of the latter and which prevents the container 3 from moving into the conduit 2. Instead of the valve 9, it is of course possible to provide any suitable member fixed to the end of conduit 2 within the container 1 and acting as a limiting means, in the same way as the valve 9, for limiting the movement of the container 3 into the conduit 2.

Figure 2:
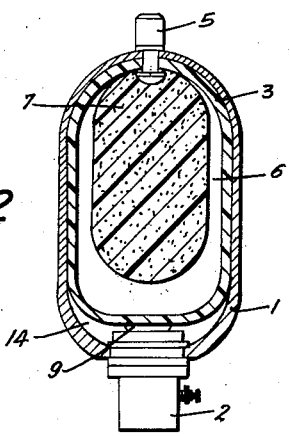
Fig. 2 is a sectional elevational view of another embodiment of a shock absorber according to the present invention.

Fig. 2 of the drawings shows an embodiment of the invention which is identical in all respects to that of Fig. 1, except that instead of a rigid body 4, the means which limits the extent of contraction of the elastic container 3 takes the form of a compressible cellular body 7 made, for example, of foam rubber or the like. The elastic container is shown in Fig. 2 in the position it takes when the pressure of the oil 14 has dropped considerably and the gas 6 has expanded the container 3 so that it engages the valve 9 as shown in Fig. 2. The compressible cellular body 7 will also prevent the elastic container 3 from contracting to such an extent that it will form cracks in itself. This compressible cellular body 7 provides the advantage, however, of allowing the gas 6 to flow into the cells of the body 7 and of eliminating any difficulties in introducing the means which limits the extent of contraction of the elastic container 3, into said elastic inner container and into the rigid container 1.

Figure 3:
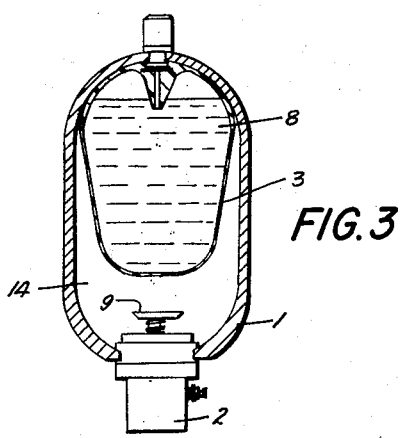
Fig. 3 is a sectional elevational view of a third embodiment of a shock absorber according to the present invention.

The embodiment of the invention which is shown in Fig. 3 is also identical with that of Fig. 1 except for the construction of the means which limits the contraction of the elastic container 3. According to the embodiment of the invention shown in Fig. 3, this means takes the form of a body of liquid 8 which is located within the container 3. This use of liquid as means which limits the extent of contraction of the elastic container 3 provides the advantage of facilitating introduction of the said means into said inner and outer container.

Figure 4:
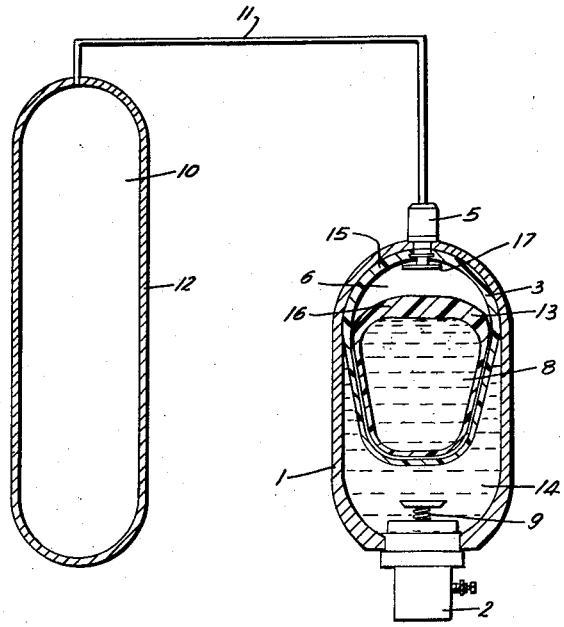
Fig. 4 is a sectional elevational view of still another embodiment of a shock absorber according to the present invention.
Figure 5:
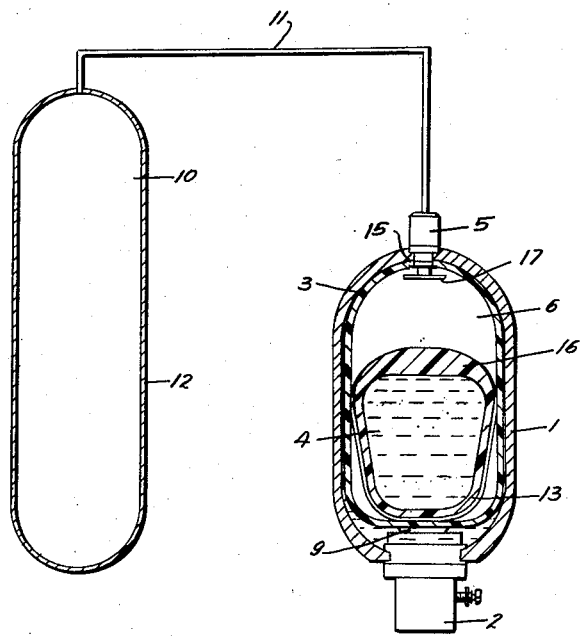
Fig. 5 is an illustration of the shock absorber of Fig. 4 with the parts thereof in a different position.

With the above described embodiments of the invention, the gas 6 within the inner elastic container 3 is placed under a certain initial pressure when the parts are first assembled, and for this reason the characteristics of the shock absorber cannot be changed after assembly and can prior to assembly only be changed within certain limits by varying the volume of the incompressible means and the initial pressure of the gas. Figs. 4 and 5 show an embodiment of the invention where it is possible to change the characteristics of the shock absorber in a wide extent and to acquire even characteristics which give a soft spring action. The shock absorber of Figs. 4 and 5 is identical with those described above except that the means for limiting the extent of contraction of the inner elastic container 3 takes the form of a body of liquid 8 which is located within a second elastic container 13 which is located within the first elastic container 3. The gas 6 in the container 3 communicates through a conduit 11 with a container 12 which holds in its interior a gas 10 such as air or the like under a certain pressure, the plug 5 being formed with a suitable bore providing communication between the conduit 11 and the interior of the elastic container 3. The pressure of the gas 10 may be regulated in any known way, and in this way it is possible to change the characteristics of the shock absorber.

The second inner elastic container 13 has an outer face directed toward the inner face of the first inner elastic container 3, and one or both of these faces are formed with grooves or the like, or may simply have an irregular configuration, so that the gas 6 may flow around the inner container 13.

If the liquid 8 shown in Figs. 4 and 5 were not located in a separate inner elastic container 13, then there would be a possibility of this liquid entering in an undesirable manner into the conduit 11 and into the container 12. The second inner container 13 prevents this undesirable result.

Furthermore, the end of the plug 5 connected to the inner elastic container 3 is provided with a valve 15 similar to the valve 9 or with any suitable rigid member located in the interior of the inner container 3 for limiting the movement of the container 13 toward the plug 5 so that the material of the container 13 cannot enter into the plug 5 when there is a great increase in the pressure of the oil 14. In order to provide proper cooperation between the inner container 13 and the valve 15 or a suitable abutment, the wall 16 of the container 13 is made thicker than the remainder of the container 13 so as to have a greater degree of rigidity than the remainder of the container 13. The structure of Figs. 4 and 5 is shown in Fig. 4 where the pressure of the oil 14 is relatively high and in Fig. 5 where the pressure of the oil 14 is relatively low.

With respect to the embodiment of the invention which is shown in Fig. 2, the body 7 of compressible cellular material preferably has in its unstressed condition a size which is substantially equal to or slightly greater than the size of the inner elastic container 3 when the latter is in its unstressed condition.

In assembling the structure of the invention, the means which limits the extent of contraction of the container 3 is located in the interior thereof and then the container 3 with its means therein is located in the interior of the outer container 1 by being passed, for example, through the bottom opening thereof, as viewed in the drawings. With the embodiment of Fig. 1, this bottom opening is made large enough to permit the solid, rigid body 4 to pass therethrough. Then, the gas 6 within the container 3 is placed under a predetermined initial pressure, except with the embodiment of Figs. 4 and 5 where the pressure of the gas 10 will control the pressure of the gas 6. The pressure of the gas 6 and the connection of the container 3 to the plug 5 is brought about in a known way not forming part of the present invention. With the embodiment of Figs. 4 and 5 the container 13 is closed in a fluid-tight manner after it is filled with the liquid 8.

It is apparent that with the structure of the invention, the inner container 3 is assured a long operable life because it cannot develop undesirable localized bulges, for example, and it cannot develop undesirable cracks and fissures, because of the above described means for limiting the contraction of the inner container 3.

It will be understood that each of the elements described above, or two or more together, may also find a useful application in other types of shock absorbers differing from the types described above.

While the invention has been illustrated and described as embodied in shock absorbers with elastic fluid containers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A shock absorber comprising, in combination, an outer container; an inner container made of elastic material and located within said outer container connected to the inner surface thereof only at one end and only at a small portion of said inner container so that the remaining unconnected wall area of said inner elastic container is free to expand and contract; a substantially incompressible filling means in said inner container having a volume only slightly smaller than the volume of said inner container, said filling means leaving a relatively small free space within said inner elastic container; a compressible working gas filling said relatively small free space within said inner elastic container so that said unconnected freely expandable and contractable wall area of said inner container is large compared to the amount of compressible gas in said inner container, whereby the smallness of the amount of compressible working gas will reduce the expansion and contraction rate of said unconnected wall area of said inner container due to pressure variations in the space in the outer container surrounding said inner container, keeping this expansion and contraction rate to a minimum; and means for feeding fluid under varying pressure into the space of said outer container surrounding said inner container.

2. A shock absorber comprising, in combination, an outer container; an inner container made of elastic material and located within said outer container connected to the inner surface thereof only at one end and only at a small portion of said inner container so that the remaining unconnected wall area of said inner elastic container is free to expand and contact; a substantially incompressible filling means in said inner container having a volume only slightly smaller than the volume of said inner container, said filling means leaving a relatively small free space within said inner elastic container, said incompressible filling means being in the form of a solid rigid body; a compressible working gas filling said relatively small free space within said inner elastic container so that said unconnected freely expandable and contractable wall area of said inner container is large compared to the amount of compressible gas in said inner container, whereby the smallness of the amount of compressible working gas will reduce the expansion and contraction rate of said unconnected wall area of said inner container due to pressure variations in the space in the outer container surrounding said inner container, keeping this expansion and contraction rate to a minimum; and means for feeding fluid under varying pressure into the space of said outer container surrounding said inner container.

3. A shock absorber comprising, in combination, an outer container; an inner container made of elastic material and located within said outer container connected to the inner surface thereof only at one end and only at a small portion of said inner container so that the remaining unconnected wall area of said inner elastic container is free to expand and contract; a substantially incompressible filling means in said inner container having a volume only slightly smaller than the volume of said inner container, said filling means leaving a relatively small free space within said inner elastic container, said incompressible filling means being in the form of a liquid; a compressible working gas filling said relatively small free space within said inner elastic container so that said unconnected freely expandable and contractable wall area of said inner container is large compared to the amount of compressible gas in said inner container, whereby the smallness of the amount of compressible working gas will reduce the expansion and contraction rate of said unconnected wall area of said inner container due to pressure variations in the space in the outer container surrounding said inner container, keeping this expansion and contraction rate to a minimum; and means for feeding fluid under varying pressure into the space of said outer container surrounding said inner container.

4. A shock absorber comprising, in combination, an outer container; an inner container made of elastic material and located within said outer container connected to the inner surface thereof only at one end and only at a small portion of said inner container so that the remaining unconnected wall area of said inner elastic container is free to expand and contract; a substantially incompressible filling means in said inner container having a volume only slightly smaller than the volume of said inner container, said filling means leaving a relatively small free space within said inner elastic container, said incompressible filling means being in the form of a liquid, said liquid being located in a second closed container of elastic material which is located in said first inner container; a compressible working gas filling said relatively small free space within said inner elastic container so that said unconnected freely expandable and contractable wall area of said inner container is large compared to the amount of compressible gas in said inner container, whereby the smallness of the amount of compressible working gas will reduce the expansion and contraction rate of said unconnected wall area of said inner container due to pressure variations in the space in the outer container surrounding said inner container, keeping this expansion and contraction rate to a minimum; and means for feeding fluid under varying pressure into the space of said outer container surrounding said inner container.

5. A shock absorber comprising, in combination, an outer container; an inner container made of elastic material and located within said outer container connected to the inner surface thereof only at one end and only at a small portion of said inner container so that the remaining unconnected wall area of said inner elastic container is free to expand and contract; a substantially incompressible fiilling means in said inner container having a volume only slightly smaller than the volume of said inner container, said filling means leaving a relatively small free space within said inner elastic container, said incompressible filling means being in the form of a liquid, said liquid being located in a second closed container of elastic material which is located in said first inner container, said second inner container having an irregular outer surface to keep said outer surface of said second inner container at least partly spaced from the inner surface of said first inner container; a compressible working gas filling said relatively small free space within said inner elastic container so that said unconnected freely expandable and contractable wall area of said inner container is large compared to the amount of compressible gas in said inner container, whereby the smallness of the amount of compressible working gas will reduce the expansion and contraction rate of said unconnected wall area of said inner container due to pressure variations in the space in the outer container surrounding said inner container, keeping this expansion and contraction rate to a minimum; and means for feeding fluid under varying pressure into the space of said outer container surrounding said inner container.

6. A shock absorber comprising, in combination, an outer container; an inner container made of elastic material and located within said outer container connected to the inner surface thereof only at one end and only at a small portion of said inner container so that the remaining unconnected wall area of said inner elastic container is free to expand and contract; a substantially incompressible filling means in said inner container having a volume only slightly smaller than the volume of said inner container, said filling means leaving a relatively small free space within said inner elastic container; a compressible working gas filling said relatively small free space within said inner elastic container so that said unconnected freely expandable and contractable wall area of said inner container is large compared to the amount of compressible gas in said inner container, whereby the smallness of the amount of compressible working gas will reduce the expansion and contraction rate of said unconnected wall area of said inner container due to pressure variations in the space in the outer container surrounding said inner container, keeping this expansion and contraction rate to a minimum; a source of gas under pressure communicating with the interior of said inner container for controlling the pressure of the working gas therein; and means for feeding fluid under varying pressure into the space of said outer container surrounding said inner container.

7. A shock absorber comprising, in combination, an outer container; an inner closed container made of elastic material and located within said outer container connected to the inner surface thereof only at one end and only at a small portion of said inner container so that the remaining unconnected wall area of said inner elastic container is free to expand and contract; a substantially incompressible filling means in said inner container having a volume only slightly smaller than the volume of said inner container, said filling means leaving a relatively small free space within said inner elastic container; a compressible working gas enclosed by said inner container and filling said relatively small free space within said inner elastic container so that said unconnected freely expandable and contractable wall area of said inner container is large compared to the amount of compressible gas in said inner container, whereby the smallness of the amount of compressible working gas will reduce the expansion and contraction rate of said unconnected wall area of said inner container due to pressure variations in the space in the outer container surrounding said inner container, keeping this expansion and contraction rate to a minimum; and means for feeding fluid under varying pressure into the space of said outer container surrounding said inner container.

References Cited in the file of this patent

UNITED STATES PATENTS

| | | |
|---|---|---|
| 594,039 | Serve | Nov. 23, 1897 |
| 2,351,761 | Hanna | June 20, 1944 |
| 2,380,866 | Overbeke | July 31, 1945 |
| 2,697,451 | Knavth | Dec. 21, 1954 |

FOREIGN PATENTS

| | | |
|---|---|---|
| 486,855 | Great Britain | June 7, 1938 |